United States Patent Office 3,211,642
Patented Oct. 12, 1965

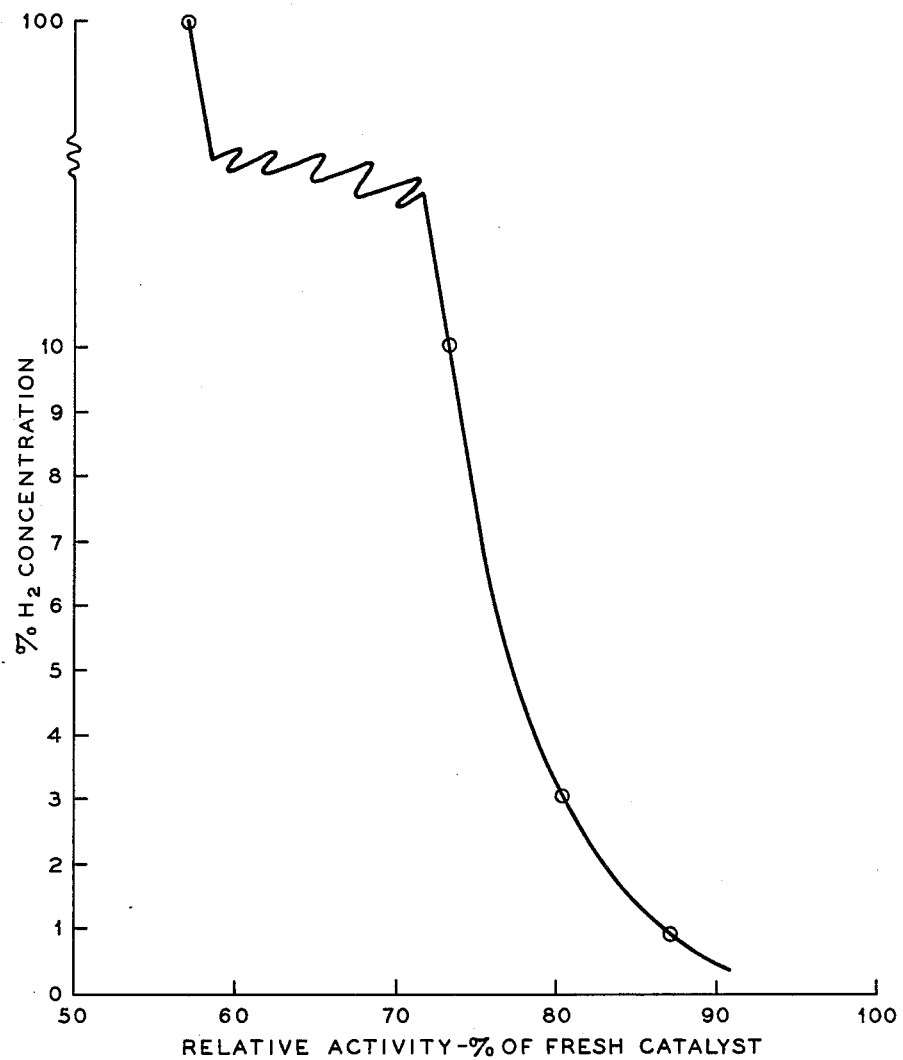

3,211,642
HYDROCRACKING AND REJUVENATION OF HYDROCRACKING CATALYST
Jack W. Unverferth, Walnut Creek, Calif., assignor to California Research Corporation, San Francisco, Calif., a corporation of Delaware
Filed Aug. 13, 1964, Ser. No. 389,387
5 Claims. (Cl. 208—110)

This is a continuation-in-part of my copending, now abandoned, application Serial No. 166,600 filed January 16, 1962, and entitled "Hydrocracking and Rejuvenation of Hydrocracking Catalyst."

This invention relates to a catalytic hydrocracking process for converting distillates and residua to various valuable products for sustained periods of on-stream operation and relates more particularly to the rejuvenation of hydrocracking catalysts which have become deactivated through long exposure to hydrocarbon feed under hydrocracking conditions. More especially, the invention relates to hydrocracking catalysts composed of nickel sulfide as a hydrogenating metal component disposed on a siliceous cracking support, which catalyst after long exposure to hydrocarbon feed under hydrocracking conditions has become deactivated and so changed that conventional removal of the accumulated carbonaceous deposits does not result in regaining an appreciable percentage of the original hydrocracking activity of the catalyst.

Although catalytic hydrocracking is recognized as one of the most useful processes available to modern petroleum refiners, the economic attractiveness of hydrocracking has been reduced by the following conflicting but interrelated factors:

(1) The inability of most modern hydrocracking processes to be operated for sustained on-stream periods under reasonable conditions without the onset of intolerable catalyst fouling and loss of conversion, and (2) The inability of those hydrocracking catalysts which had been operated for long on-stream periods to be satisfactorily regenerated.

It is well known that the current costs of hydrocracking catalysts are high and that these costs form a very substantial portion, not only of the original plant investment, but of the operating costs due to the necessary replacement of expensive fresh catalyst from time to time as it becomes deactivated and cannot be satisfactorily regenerated.

While many literature references exist that purport to disclose various methods for regenerating hydrocracking catalysts, conventional methods of regeneration are found to usually restore only a few percent of the fresh catalyst activity that has been lost. For example, if the catalyst, upon exposure for long periods under hydrocracking conditions, has its activity reduced to 25% of its original 100% activity, a regeneration that purports to double the activity of the spent catalyst in reality produces a catalyst having only 50% of the fresh catalyst activity.

The prior art has attempted to meet the problem of restoring activity to expensive hydrocracking catalysts that have become spent and deactivated in service in a number of ways. For example, conventional regeneration in an oxygen-containing stream, whereby carbon and other contaminants are burned from the catalyst, has been used. Various chemical reactivation means have been proposed. However, all of these proposals have left much to be desired in attempting to solve the problem of restoring catalyst activity to those catalysts which can be and are operated in a hydrocracking process for long on-stream periods at reasonable operating conditions without intolerable catalyst fouling rates. As shown in Scott Patent 2,944,006, hydrocracking processes to convert hydrocarbon feed to valuable products can be carried out for long on-stream periods at reasonable operating conditions without intolerable catalyst fouling rates with a sulfide of nickel or cobalt disposed on an active siliceous cracking catalyst support, provided the hydrocarbon feed brought into contact with such catalyst has a low nitrogen content. However, it has been found that such catalyst, after such long exposure to hydrocarbon feed under hydrocracking conditions, has become deactivated with the metal component so changed that conventional removal of the accumulated carbonaceous deposit does not result in the catalyst regaining an appreciable or adequate percentage of its original hydrocracking activity.

Therefore, it is an object of the present invention to provide a method of rejuvenating catalysts that have become deactivated by long exposure to hydrocarbon feed under hydrocracking conditions. It is a further object of this invention to provide a hydrocracking process for conversion of hydrocarbon stocks wherein the catalyst, upon becoming deactivated in the course of the hydrocracking process, can be regenerated to regain substantially all of its original hydrocracking activity, thereby extending greatly the on-stream period for catalyst without replacement.

It has been discovered that hydrocracking catalysts composed of at least one metal component disposed on a cracking support undergo a change during exposure to hydrocarbon feed under hydrocracking conditions when the hydrocracking catalyst is composed of a nickel sulfide disposed on a siliceous cracking support. The change which occurs appears to be related to a crystallite growth phenomenon of the hydrogenating nickel component of the catalyst during exposure thereof under hydrocracking conditions to hydrocarbon feeds substantially free of nitrogen compounds. While it is not my purpose to set forth in detail any theory to explain the mechanism of catalyst deactivation and the difficulty of regeneration based on a metal crystallite growth phenomenon, it will suffice to point out that, in accordance with the present invention, such deactivated catalysts can now be restored substantially to their fresh hydrocracking activity.

The rejuvenation procedure of the present invention generally comprises removal of the accumulated carbonaceous deposits on the catalyst and oxidizing the hydrogenating metal component, preferably in a step-wise oxidation procedure detailed below, and then reducing the metal oxide component by contacting it with a reducing gas composed of substantially less than 100% hydrogen. While mixtures of hydrogen and nitrogen containing up to about 5% hydrogen may be used to advantage, it is preferable to use less than 3 mol percent of hydrogen and more preferably, less than 1 mol percent hydrogen in admixture with an inert gas such as nitrogen. A surprising aspect of the use of such dilute hydrogen-containing reducing gases is that the water formed in reduction of the metal oxide begins to show up in appreciable quantities in the effluent gas at much lower temperatures (i.e., of the order of 100 to 150° lower) than reduction with 100% hydrogen.

The criticality of the low mol percent of hydrogen in the nitrogen-hydrogen reducing gas to the restoration of catalyst activity approaching that of original fresh catalyst activity is shown in the curve in the figure of the drawings. As will be discussed more fully later, a catalyst regenerated with the procedure involving reduction with 100% hydrogen has an activity of about 57% of original catalyst activity as compared to a relative activity of 87% of original catalyst activity for a catalyst regenerated with a procedure involving reduction with a nitrogen-hydrogen mixture containing only 1 mol percent of hydrogen.

Following the reduction of the hydrogenating metal component of the hydrocracking catalyst, it is preferred to reoxidize the metal component at temperatures generally below 950° F., then preferably to thermactivate by contact with a stream of hot, dry air at about 1200–1600° F., and thereafter resulfiding the oxidized catalyst at temperatures below 850° F. In some instances, the reoxidizing step may be omitted and the reduced metal directly sulfided, particularly in accordance with the preferred sulfiding procedure described below. Likewise, some of the advantages of the present invention can be obtained and it is so contemplated, by sulfiding the metal component in situ in the reactor by exposure to a hydrocarbon feed stock containing sulfur compounds.

The process of the present invention as described above provides a method of rejuvenating, in place in the reactor if desired, a hydrocracking catalyst which, before long exposure to hydrocarbon feed under hydrocracking conditions, is an active hydrocracking catalyst composed of nickel sulfide as the hydrogenating metal component on a siliceous cracking support but which, after long exposure to hydrocarbon feed under hydrocracking conditions, has become deactivated with the hydrogenating metal component so changed that conventional removal of accumulated carbonaceous deposits does not regain an appreciable percentage of the original hydrocracking activity of the catalyst. While it is not intended to be bound by any theory, it has been discovered that, with substantially nitrogen-free (i.e., less than 10 p.p.m., usually less than 1 p.p.m., of total combined nitrogen) hydrocarbon stocks, such hydrocracking catalysts undergo a hydrogenating metal crystallite growth during exposure to hydrocracking conditions. Catalysts so changed are not restored to any substantial percentage of their original cracking activity by conventional or other regeneration procedures heretofore proposed. Hence, it has been assumed that, after long exposure to substantially nitrogen free hydrocarbon stocks under hydrocracking conditions, the hydrocracking catalysts with the hydrogenating metal so changed was not sufficiently regenerable. Hence, such deactivated hydrocracking catalysts had to be replaced at great expense with fresh catalyst.

However, the present invention overcomes these prior disadvantages by providing a method for rejuvenating said deactivated catalyst to substantially its original fresh activity or approaching it sufficiently that the over-all life of the catalyst is greatly extended. As a consequence of such rejuvenation, the economic application of the hydrocracking process is greatly extended.

The hydrocracking conversion of hydrocarbon stocks, including hydrocarbon distillates boiling from about 300° to 1100° F., hydrocarbon residual boiling above about 1050° F., and mixtures thereof, is usually conducted by contacting said feed in a hydrocracking zone with a catalyst comprising the hydrogenating-dehydrogenating component on an active, acid, cracking support at a temperature from 450° to 900° F., preferably for a major portion of the on-stream period below 750° F., a space velocity of from about 0.2 to 5.0 or more, and a hydrogen partial pressure of at least 350 p.s.i.g. with at least 1000 s.c.f. of hydrogen per barrel of feed, there being consumed in the hydrocracking zone at least 500 s.c.f. of hydrogen per barrel of feed converted to products boiling below the initial boiling point of said feed. While nickel sulfide is preferred as the hydrogenating-dehydrogenating component in such hydrocracking conversions, other hydrogenating components are the compounds of metals of groups VI and VIII of the periodic table, which compounds are not readily reduced to the corresponding metal form in the hydrocracking zone. Combinations of metal sulfide with one or more metals and compounds thereof from groups VIII, VI–B and I–B of the periodic table may be used. However, the procedure is preferably applied to catalyst wherein the only hydrogenating components are selected from group VIII. The amount of the hydrogenating component may be varied from 0.5 to 30% or more, more desirably in the range of 4 to 15%, based on the weight of the entire catalyst composition. The remaining, or cracking component of the hydrocracking catalyst may be selected from the various siliceous cracking catalysts, such as the composites of silica-alumina, silica-magnesia, silica-alumina-zirconia, silica-zirconia-titania and synthetic metal aluminum silicates (including synthetic chabazites normally referred to as "molecular sieves") which have been found to impart the necessary degree of cracking activity to the catalyst. Particularly preferred catalyst components are synthetically prepared silica-alumina compositions having a silica content in the range of from about 15 to 99% by weight and an alumina content of 1 to 85% by weight. The hydrocracking conversion is normally preceded by a treatment to remove excess nitrogen content from the hydrocarbon charging stocks. Preferably, this is accomplished by a hydrodenitrification process comprising contacting said feed with hydrogen in a suitable catalyst under hydrofining conditions, such as a space velocity of 0.2 to 10 L.H.S.V., a pressure of 500–5000 p.s.i.g. and a temperature of 500–850° F.

In the following more detailed description, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 1000 hours.

As indicated above, the hydrocracking catalyst has a high degree of cracking activity. In this connection the term "high cracking activity" is employed herein to designate those catalysts having activity equivalent to a Cat. A value of at least 25 or a quinoline number of at least 20 (Jour. Am. Chem. Society 72, 1554 (1950)).

The following hydrocracking catalysts are representative of those which are adapted to be used in the practice of the present invention, the support in each case being a synthetically prepared silica-alumina composite containing about 87 to 90% silica and having a Cat. A value of approximately 46.

NICKEL SULFIDE (6% Ni) ON SILICA-ALUMINA

This catalyst was prepared by impregnating the silica-alumina particles with a solution of nickel nitrate in a concentration sufficient to provide the catalyst with 6 weight percent nickel on a dry basis. The catalyst was dried at 600° F. and was then thermactivated by contact for 2.2 hours with a stream of hot air at an average temperature of 1427° F., said thermactivation treatment forming the subject of application Serial No. 794,109 filed February 18, 1959. The catalyst was then cooled and reduced by contact with a stream of hydrogen, first at atmospheric pressures as the catalyst was heated from 60° to 570° F. at a rate of 100° F. per hour, and thereafter at 1500 p.s.i.g. and 570° F. for one hour. The metallic nickel present on the catalyst was then converted to the sulfide form by contacting the catalyst with a solution of isopropyl mercaptan (10 weight percent) in hexane, hydrogen being present in amounts such as to give the equivalent of 2 weight percent $H_2S$ in the gas stream passed over the catalyst. The sulfiding treatment was continued for 3½ hours at 1500 p.s.i.g. and 570° F., a treatment which provided the catalyst with a 2.6-fold excess of sulfur over the amount theoretically required to convert all the nickel to nickel sulfide.

NICKEL SULFIDE (3.6% Ni) ON SILICA-ALUMINA

This catalyst was prepared by impregnating 11 liters of crushed silica-alumina aggregate with 2896.9 grams of nickel nitrate hexahydrate dissolved in enough water to make 8800 milliliters total solution, following which the material was held for 24 hours at 70° F. The catalyst was then dried for 10 hours at 250° F. and thereafter calcined at 1000° F. for 10 hours. The calcined material was reduced in an atmosphere of hydrogen at 580° F. and 1200 p.s.i.g., following which the resulting nickel-bearing catalyst was sulfided in an atmosphere containing 8% $H_2S$ in hydrogen at 1200 p.s.i.g. and 580° F., thereby converting essentially all the nickel to nickel sulfide.

NICKEL SULFIDE (2.5% Ni) ON SILICA-ALUMINA

This catalyst was prepared by impregnating 11 liters of crushed silica-alumina aggregate with a solution prepared by mixing 1500 milliliters water and 500 milliliters of ammonium hydroxide solution with 1082 grams of ethylene diamine tetra-acetic acid and 469 grams of nickel carbonate, the solution being made up to a total of 4000 milliliters with water. The impregnated material was held for a period of 24 hours at 70° F., following which it was centrifuged and calcined for 10 hours at 1000° F. in air to convert the nickel chelate to nickel oxide. The catalyst was then reduced in an atmosphere of hydrogen at 650° F. and 1200 p.s.i.g. and sulfided in situ in the reactor by the use of a feed stream made up of a catalytic cycle oil (49 volume percent aromatics) to which 0.1% by volume of dimethyl disulfide had been added at a pressure of 1200 p.s.i.g. and in the presence of approximately 6500 s.c.f. of hydrogen per barrel of feed.

In the rejuvenation of such hydrocracking catalysts which have become so deactivated and changed that conventional removal of the accumulated carbonaceous deposits does not regain an appreciable percentage of the original hydrocracking catalyst activity, the first step of the process is to burn off a major portion of the carbonaceous material from the catalyst and to oxidize a major portion of the nickel hydrogenating component to the nickel oxide at low temperatures. A dry combustion supporting gas such as a nitrogen-air mixture, preferably free of sulfur oxides, is used and, at least during the initial portion of the burn and oxidation the catalyst temperature is controlled below 750° F., usually above 450° F. at the start. Such treatment with the combustion supporting gas is continued until burning substantially ceases. When the catalyst is employed in the reactor of one or more fixed beds, the catalyst is contacted with dry combustion supporting gas at below 750° F. until an initial burning wave has passed through the catalyst beds. Usually some carbonaceous material still remains on the catalyst and some of the nickel hydrogenating component is not completely converted to the oxide. Thereafter, the catalyst is contacted again with the dried combustion supporting gas at a maximum catalyst temperature of at least 50° F. higher than the first burned, but controlled below 850° F., while a second burning wave passes through the catalyst beds. The carbonaceous deposits are thereby substantially completely removed and the nickel hydrogenating component substantially converted to nickel oxide generally to insure complete oxidation. A final burn with the oxygen concentration and temperature of the dried combustion supporting gas increased up to 950° F. to 1000° F. is carried out until no further burning is observed. In the preferred method the temperature is raised in increments of about 100° to 150° F., using a temperature of 450° to 700° F. during a first burn, such as 500° to 600° F.; a temperature of 650° to 850° F. during a second burn, such as 700° to 800° F.; and a temperature of 800° to 1000° F., especially 850° to 950° F. during the final contacting. Preferably, the oxidations are carried out with an elevated pressure of above 200 p.s.i.g., such as above 500 p.s.i.g. up to 10,000 p.s.i.g., using a circulating inert gas to which is added $\frac{1}{10}$ to 4 mol percent of oxygen during the initial portion of the burn and gradually raising the oxygen content.

The dry combustion-supporting gas may be any suitable mixture of oxygen with an inert carrier gas. Examples are nitrogen-air and flue gas-air mixtures. Where the combustion-supporting gas is recycled, it is preferred to remove combustion products such as $CO_2$, $SO_2$ and $H_2O$ to prevent build up in the circulating gas. For this purpose the gas may be scrubbed with a caustic solution at temperatures below about 200° F. Other means for removing $SO_2$ and $H_2O$ may be used instead of or in addition to caustic scrubbing such as, for example, catalytic or adsorptive contacting.

It is most desirable that the combustion-supporting gas be dry. By "dry" is meant that the molar concentration of water vapor in the combustion supporting gas must be relatively low, that is, at least below about 6 mol percent and preferably below 1 mol percent. An elevated pressure is advantageous in helping to maintain the required low water vapor concentration. Thus, when burning carbonaceous deposits from the catalyst with circulating nitrogen-air at 1000 p.s.i.g., mere cooling of the gas (after contact in the catalyst) to about 150° F. is adequate to condense out moisture in excess of about 0.4 mol percent. The condensed water may be collected in a caustic solution to remove $SO_2$, whereupon the dried gas may be recirculated for a point of contacting of the catalyst.

The second and most critical step of the process of rejuvenating such deactivated hydrocracking catalysts is the reduction of the oxidized catalyst with a dry mixture of an inert gas and a reducing gas with a low concentration of the latter. The inert gas is most conveniently nitrogen, but may be other inert gases such as dry flue gas. The reducing gas is preferably hydrogen. Carbon monoxide may also be mentioned as a reducing gas. As pointed out above, the reducing gas concentration should be low, that is, below 10 mol percent and preferably below 3 mol percent. The concentration may be as low as $\frac{1}{10}$ percent of hydrogen, and the especially preferred range is $\frac{3}{10}$ to 1 percent of hydrogen in a nitrogen-hydrogen mixture, all percentages of hydrogen throughout this specification being given in mol percentages. The flow of reducing gas over the catalyst is most desirably started at a temperature below which an appreciable reaction takes place, then gradually raising the temperature to bring about the reduction of the oxides under controlled conditions. Thus, the reducing gas is flowed over the catalyst at an initial temperature of around 450° F. to 500° F. in the preferred operation. Generally, the catalyst temperature is controlled between 400° and 750° F. during the initial portion of the reduction and then raised during the latter part of the reduction, but below 1000° F. as a maximum. Preferably, the catalyst is first contacted with the reducing gas for several hours at 450° to 500° F., then the temperatures raised to a catalyst temperature of 550° to 650° F. and maintained there for several hours (i.e., 2 to 5 hours); and finally the temperature of the catalyst is adjusted during the final reduction, preferably at 850° to 950° F. Treatment to the reducing conditions is continued for a sufficient time to insure substantially complete reduction of the nickel hydrogenating component to the metal, usually of the order of 24 hours or sometimes longer. It is important that sufficient volume of reducing gas be flowed over the catalyst during the reduction period to rapidly remove the reduction products from contact with the catalyst. When operating with the reducing gas at 1 atmosphere pressure, which is often preferred, a space rate of 500 to 5000 volumes of reducing gas per volume of catalyst per hour is usually sufficient. When the reduction of the oxide starts, an appreciable amount of water begins to appear in the effluent gases, the space velocity of the reducing gas may be advantageously increased to a minimum of 5000 v./v./hr. In this period of appreciable water generation, a space velocity of 10,000 v./v./hr. at atmospheric pressure may be the maximum needed. When the pressure on the reducing gas is increased as is sometimes desirable to reduce the treating time, the space velocity of the reducing gas is increased in order to take into account the effect of the mol percent of water being produced and the effect of heat transfer at the surface of the catalyst. As indicated, it is important that the reducing gas be dry; hence, when recycling it is important to remove the water in the gas before it is recycled.

Following the reduction step, the catalyst can be of use directly in hydrocracking operations, particularly with sulfur-containing feeds which will sulfide the catalyst during start up to the desired nickel sulfide state. Likewise, the reduced catalyst can be sulfided before contact with hydrocarbon charging stocks. However, the advantages accruing from the condition of the catalyst and to the reduction step are preserved to a higher degree if the reduced catalyst is reoxidized prior to sulfiding. Hence the preferred next step in the process is the reoxidation of the reduced nickel, preferably in the same manner as preferred for the first oxidation. Although the catalyst contains very little carbonaceous material so that the heat released by combustion during this second oxidation is much less than in the first oxidation, the oxidation is carried out in a stepwise fashion in the preferred procedure. Thus, the catalyst temperature should be controlled to below 950° F. and preferably in the range of 500 to 750° F. during the initial part of the oxidation. Dry combustion-supporting gas is used with the oxygen concentration, perferably controlled below about 6 mol percent and more especially in the range of ½ to 1 mol percent during the initial portion of the oxidation. In the latter stages of the reoxidation step, the oxygen concentration may be raised to that of straight air, provided that the temperature of the catalyst is maintained in the range of 900° F. to 1050° F. Preferably, thereafter, the catalyst is thermactivated by contact with a stream of hot, dry nonreducing gas for several hours at a catalyst temperature in the range of 1200–1600° F.

In the preferred final step of the process, the catalyst is sulfided. This may be accomplished in any of the several known ways such as by contacting the catalyst with a sulfiding agent, such as $H_2S$, mixtures of hydrogen and $H_2S$, and mixtures of hydrogen and organic sulfur compounds reducible to $H_2S$ at the conditions employed. Generally, the catalyst temperature during sulfiding is controlled below 850° F. and preferably below 750° F. The best results are obtained by contacting the oxidized catalyst with a mixture of hydrogen and a vaporized organic sulfur compound, such as dimethyl disulfide, isopropyl mercaptan, or carbon disulfide at temperatures in the range of 450° to 650° F. The sulfur content of a mixture of hydrogen and organic sulfur compound is advantageously obtained by metering into the circulating gas a solution of the organic sulfur compound in a light paraffinic solvent. An excess of sulfiding agent is to be employed to insure substantially complete conversion of the nickel oxide to nickel sulfide.

All of the steps of the rejuvenation procedure of the present invention are ordinarily and preferably carried out while the catalyst is contained within the reaction chamber where it is normally employed for hydrocracking hydrocarbon stocks. After completion of the rejuvenation steps, the catalyst is in condition for reuse as a hydrocracking catalyst. Therefore, with the sulfiding of the catalyst completed in the hydrocracking reactor, the operations of start up are carried out for placing the system back on flow of hydrocracking stock over the rejuvenated catalyst at hydrocracking conditions.

To illustrate the process of the present invention, tests were carried out for the catalysts prepared with 6% nickel on silica-alumina, as in the first preparation described above, after such catalyst had been used in hydrocracking operations for several thousand hours on hydrocarbon feed stock having a total nitrogen content of less than 1 p.p.m. At this point in the hydrocracking operations, the temperature necessary to maintain hydrocarbon conversion at 60% was approximately 750° F. Analysis of the catalyst at this stage showed metal crystallite sizes of the order of 500 to 750 A. Attempts to regenerate the catalyst to adequate activity by conventional procedures were unsuccessful as shown in the first two examples below.

*Example I*

The above-described deactivated hydrocracking catalyst was subjected to a conventional regeneration treatment by contact with a mixture of nitrogen and air at an elevated temperature of between 800 and 1000° F. for about 24 to 80 hours. The nitrogen-air mixture contained from about ½ to 2% oxygen with the remainder nitrogen. Sulfiding of the oxidized catalyst was carried out by circulating hydrogen containing 1% dimethyl disulfide through the reactor at about 450° F. for several hours to convert substantially all the nickel to nickel sulfide. Two regenerations carried out in this manner resulted in catalyst having a net relative hydrocracking activity, as compared to the same fresh catalyst, of 68 and 70%.

*Example II*

Another sample of the same catalyst after the conventional oxidation treatment in nitrogen and air as described in Example I was reduced in 100% hydrogen flowing at a rate of 390 v./v./hr. in rising temperature increments at from about 400° F. at 1 atmosphere pressure and finishing at 900° F. at 600 p.s.i.g. The temperature was held at each level for from about 0.5 to several hours until the exothermic reduction reaction attributable to the new temperature was indicated by thermocouple measurements to be completed throughout the catalyst bed. Thus, the catalyst was exposed to the flowing hydrogen as follows: 400° F. for 2 hours, 560° F. for 16 hours, 650° F. for 4 hours, and 750° F. for 3 hours, all at atmospheric pressure. The final hydrogen treatment was at 600 p.s.i.g. at 900° F. for 4 hours. Then the catalyst was reoxidized with dry oxygen-containing gas at a space rate of 3900 v./v./hr., with stepwise increases in temperature as follows: 500° F. for 1 hour, 650° F. for 1½ hours, 800° F. for 2 hours and 950° F. for 1 hour, all at 1 atmosphere using nitrogen containing about ½ mol percent oxygen. Then the pressure was raised to 600 p.s.i.g. with the temperature at 950° F. for 1½ hours and then 1000° F. for 1 hour. Then, at this temperature, the oxygen concentration was gradually increased over a two hour period until the gas was all air. Thereafter, the catalyst was kept at 1000° F. for 5 hours in flowing air at 600 p.s.i.g. Then the catalyst was thermactivated for 4 hours in a stream of hot air at about 1400° F. catalyst temperature. The catalyst was then sulfided by adding to circulating hydrogen isopropyl mercaptan at a rate to give about 2% $H_2S$ concentration in the hydrogen flowing through the reactor at about 450° F. over several hours to convert substantially all the nickel to nickel sulfide. The catalyst resulting from the above regeneration procedure had a relative activity as compared to fresh catalyst of 57%, as shown in the figure.

*Example III*

Another sample of the same catalyst after the same oxidative treatment in nitrogen and air was reduced as follows. The reducing gas employed was a dry mixture of 10% hydrogen and 90% nitrogen. The reaction was started by flowing reducing gas at 1 atmosphere at a space rate of 3900 v./v./hr. through the catalyst bed at a temperature of about 500° F. for 1½ hours. The temperature was raised in increments of about 150° F. and held at each level for sufficient time until the exothermic reduction reaction attributable to the new temperature was indicated by thermocouple measurements to be completed throughout the catalyst bed. The objective, as indicated hereinbefore, in such an incremental reduction procedure is to keep the partial pressure water at a minimal level. Thus, after the start at 500° F., the treatment was as follows: 650° F. for 2 hours and 800° F. for 2 hours with the 10% hydrogen-in-nitrogen mixture. Then the hydrogen concentration was increased to 20% hydrogen for contact at 800° F. for 1 hour. Then 50% hydrogen was used at 800° F. for 1 hour. Thereafter, 100% hydrogen was used for 1 hour at 800° F., then the pressure raised to 600 p.s.i.g. for ½ hour, and finally, the catalyst was contacted with 100% hydrogen at 900° F. for 2 hours. The incremental reduction procedure is advantageous because the various compounds in the catalyst, or various parts of the catalyst, do not all reduce at the same temperature, and the water created upon reduction of one portion of the catalyst at one temperature level can be removed before additional water is created by reduction of another portion of the catalyst. Thereafter, the reduced catalyst was reoxidized in accordance with the incremental oxidation procedure used in Example II. Then the catalyst was thermactivated and resulfided by the procedures used in Example II. The resulting rejuvenated catalyst had a relative activity as compared to fresh catalyst of 73%. This point is shown on the figure in the drawing in terms of 10% hydrogen in the initial reducing gas.

*Example IV*

Another sample of the same catalyst after the oxidative treatment in nitrogen and air was reduced in dry nitrogen containing 3% hydrogen under a vacuum of 26 inches of mercury at a total gas flow rate of approximately 6 volumes per volume of catalyst per hour. The temperature was raised in increments of 150° F. from the initial start of 400° F. until the temperature reached 900° F. over an eight hour period. At this point the hydrogen content of the dry nitrogen-hydrogen mixture was raised to 6% hydrogen and the catalyst subjected to a flowing reducing gas of this composition for one hour at 900° F. After resulfiding this reduced catalyst by the procedure used in Example II, the catalyst had a relative activity as compared to fresh catalyst of about 80%, as shown in the figure.

*Example V*

The foregoing example was repeated except that the catalyst obtained after the reducing treatment was reoxidized by the procedure of Example II before it was resulfided. The relative activity was the same as that obtained in Example IV.

*Example VI*

Another sample of the same catalyst after the oxidative treatment in nitrogen and air was reduced in dry nitrogen gas hydrogen mixture containing 1 mol percent of hydrogen at 1 atmosphere pressure. The total gas flow rate was approximately 3900 volumes per volume of catalyst per hour. The temperature at the start of the reduction was 500° F. (for 1 hour) and was raised to 750° F. and kept there overnight (about 18 hours). After 4 hours at 900° F., the temperature in the reduction with the 1% hydrogen was raised to 1050° F. for 2 hours. Then the reduced catalyst was reoxidized in increments starting with dry combustion-supporting gas composed of nitrogen containing ½ mol percent of oxygen at 1 atmosphere and at a space rate of 3900 v./v./hr. The starting temperature was 750° F. After 2 hours, the temperature was increased to 850° F. for 1 hour and then to 950° F. for 1 hour. Then air at 600 p.s.i.g. was used at 950° F. for 1 hour and then at 1050° F. for 1 hour. Then the catalyst was thermactivated and resulfided by the procedures of Example II. The rejuvenated catalyst had a relative activity as compared to fresh catalyst of 87%.

As shown in the drawing, the relative percentage of activity based on original or fresh catalyst activity increases markedly as the hydrogen content of the reducing gas is decreased below 10% and particularly as it is decreased below 3%. While restoration of 87% of the original catalyst activity is obtained with the reducing gas containing only 1% of hydrogen, greater percentages of restoration of the catalyst can be expected to be obtained on the basis of the data presented, when using reducing gas containing less than 1 mol percent of hydrogen down to .3 mol percent or even .1 mol percent of hydrogen. Thus, the rejuvenation procedure of the present invention provides a means for restoring a deactivated hydrocracking catalyst not regenerable by conventional procedures, to an activity approaching the original fresh activity of the catalyst sufficiently such that the over-all life of the catalyst is greatly extended. As a consequence of such rejuvenation process of the present invention, the economic application of the hydrocracking process is greatly extended.

I claim:
1. In a process for rejuvenating a hydrocracking catalyst which before long exposure to hydrocarbon feed under hydrocracking conditions is an active hydrocracking catalyst composed of nickel sulfide as a hydrogenating metal component and a siliceous cracking support but which after long exposure to hydrocarbon feed under hydrocracking conditions has been deactivated, wherein the carbonaceous deposits accumulated on said deactivated catalyst are removed under conditions such that the nickel hydrogenating component is oxidized to nickel oxide and thereafter the catalyst is resulfided prior to its reuse for hydrocracking, the improvement for substantially increasing the percentage of recovery of the original fresh hydrocracking activity, which comprises subjecting said deactivated catalyst after said removal of carbonaceous deposit and conversion of the nickel hydrogenating metal component to the nickel oxide, to contact with a flowing stream of a mixture free of water of an inert gas and hydrogen containing less than 3 mol percent of hydrogen until said nickel oxide is reduced to nickel.

2. A process for rejuvenating a hydrocracking catalyst which before long exposure to hydrocarbon feed under hydrocracking conditions is an active hydrocracking catalyst composed of nickel sulfide as a hydrogenating metal component disposed on a siliceous cracking support but which after long exposure to hydrocarbon feed hydrocracking conditions has become deactivated with the metal component so changed that conventional removal of the accumulated carbonaceous deposits does not regain an appreciable percentage of the original hydrocracking catalyst activity, which process comprises the steps of:

(a) contacting said deactivated catalyst with a dry combustion-supporting gas to remove the major portion of said carbonaceous deposits and to oxidize a major portion of the nickel hydrogenating component to nickel oxide at a catalyst temperature below 750° F., (b) continuing said contact with dry combustion-supporting gas at increased temperatures but no higher than 1000° F. until combustion of the carbonaceous deposits and oxidation to nickel oxide are substantially completed, (c) then contacting said oxidized catalyst with a nitrogen-hydrogen mixture, free of water and containing less than 1 mol percent of hydrogen until said nickel oxide is reduced to nickel, and (d) finally sulfiding the catalyst with a catalyst temperature controlled below 850° F. to convert nickel to nickel sulfide.

3. The method of reactivating a hydrocracking catalyst comprising nickel sulfide on a refractory siliceous oxide cracking support, which catalyst has been deactivated by use for a period of in excess of 500 hours for the hydrocracking of a hydrocarbon charging stock, which method of reactivating comprises oxidizing said catalyst to burn off accumulated carbonaceous deposits and to convert nickel sulfide to nickel oxide, then contacting said oxidized catalyst with a nitrogen-hydrogen mixture, free of water and containing less than 1 mol percent of hydrogen until the nickel oxide is reduced to nickel, and then sulfiding the catalyst to convert nickel to nickel sulfide.

4. In a process of hydrocracking hydrocarbon stocks at elevated temperatures and pressure with excess hydrogen and a catalyst comprising nickel sulfide on a siliceous cracking support, wherein said catalyst becomes measurably deactivated after a substantial period of exposure to said hydrocracking conditions, the improvement which comprises rejuvenating said deactivated catalyst by oxidizing said catalyst to convert nickel sulfide to nickel oxide and to remove accumulated carbonaceous deposits upon said catalyst, then contacting said oxidized catalyst with a nitrogen-hydrogen mixture, free of water and containing less than 1 mol percent of hydrogen until the nickel oxide is reduced to nickel, thereafter sulfiding said catalyst and then continuing the hydrocracking of hydrocarbon stocks with said rejuvenated catalyst.

5. In a process of hydrocracking hydrocarbon stocks at elevated temperatures and pressures with excess hydrogen and a catalyst comprising a nickel sulfide as the hydrogenation metal component on a siliceous cracking support, wherein said catalyst accumulates carbonaceous deposits and measurably deactivates after exposure in excess of 1000 hours of said hydrocracking conditions, the improvement which comprises discontinuing the flow of hydrocarbon stock over said deactivated catalyst and rejuvenating said deactivated catalyst by oxidizing said catalyst to burn off said carbonaceous deposits and convert the hydrogenating nickel component to nickel oxide, then contacting said oxidized catalyst with hydrogen diluted with an inert gas such that the perfluent gas mixture contains 0.1 to 1 mol percent of hydrogen to reduce said nickel oxide to nickel, said reduction being carried out at temperatures of 450° to 900° F. with the first part of said reduction being in the lower portion of such temperature range, the reducing gas being free of water and passing over the catalyst at a rate of at least 500 volumes per volume of catalyst per hour, then sulfiding the catalyst, and thereafter hydrocracking hydrocarbon stocks with the resultant rejuvenated catalyst.

References Cited by the Examiner

UNITED STATES PATENTS

| 2,560,433 | 7/51 | Gilbert et al. | 208—110 |
| 2,944,005 | 7/60 | Scott | 208—109 |
| 3,132,091 | 5/64 | Young | 208—110 |
| 3,166,489 | 1/65 | Mason et al. | 208—111 |

PAUL M. COUGHLAN, *Primary Examiner.*

ALPHONSO D. SULLIVAN, *Examiner.*